US012682615B2

(12) United States Patent     (10) Patent No.:   US 12,682,615 B2
Chen et al.                             (45) Date of Patent:       Jul. 14, 2026

(54) SPARSE SEMANTIC DISENTANGLED FACE ATTRIBUTE EDITING

(71) Applicant: Microsoft Technology Licensing, LLC, Redmond, WA (US)

(72) Inventors: Tianyi Chen, Redmond, WA (US); Tianyu Ding, Kirkland, WA (US); Luming Liang, Redmond, WA (US); Ilya Dmitriyevich Zharkov, Redmond, WA (US); Guangzhi Wang, Singapore (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 302 days.

(21) Appl. No.: 18/411,253

(22) Filed: Jan. 12, 2024

(65) Prior Publication Data

US 2025/0232565 A1     Jul. 17, 2025

(51) Int. Cl.
    *G06V 10/774*      (2022.01)
    *G06V 10/74*       (2022.01)
              (Continued)

(52) U.S. Cl.
    CPC .......... *G06V 10/774* (2022.01); *G06V 10/761* (2022.01); *G06V 10/762* (2022.01);
              (Continued)

(58) Field of Classification Search
    CPC ...... G06N 3/045; G06N 3/0464; G06N 3/094; G06N 3/0475; G06N 3/08; G06N 3/09;
              (Continued)

(56) References Cited

U.S. PATENT DOCUMENTS

2022/0028139 A1*   1/2022   Mitra ................... G06N 3/0499
2022/0122305 A1*   4/2022   Smith ....................... G06T 3/18
              (Continued)

OTHER PUBLICATIONS

Chen, et al., "Only Train Once: A One-Shot Neural Network Training And Pruning Framework", In Journal Advances in Neural Information Processing Systems, Dec. 6, 2021, pp. 1-15.

(Continued)

*Primary Examiner* — Alex Kok S Liew
(74) *Attorney, Agent, or Firm* — Shook Hardy & Bacon L.L.P.

(57)            ABSTRACT

The technology described herein provides an improved framework for a face editing task performed by a machine-learning model. The technology provides a self-training strategy aimed at achieving more robust and generalizable face video editing. The self-training strategy helps overcome a shortage of training data relevant to the face editing task. The technology also provides a semantically disentangled architecture capable of catering to a diverse range of editing requirements. The technology also provides sparse learning to avoid over editing. The sparse learning technology partitions the model being trained according to facial regions being edited. This strategy teaches the model to transform only the most pertinent facial areas for a specific task. For example, when changing the eyebrows on a face the eye area will change, but the mouth area should remain unchanged.

20 Claims, 7 Drawing Sheets

(51) Int. Cl.
| | |
|---|---|
| *G06V 10/762* | (2022.01) |
| *G06V 10/776* | (2022.01) |
| *G06V 10/82* | (2022.01) |
| *G06V 40/16* | (2022.01) |
| *G11B 27/031* | (2006.01) |

(52) U.S. Cl.
CPC ............ *G06V 10/776* (2022.01); *G06V 10/82* (2022.01); *G06V 40/16* (2022.01); *G11B 27/031* (2013.01)

(58) Field of Classification Search
CPC ...... G06N 3/047; G06N 3/088; G06N 3/0455; G06N 20/00; G06N 3/084; G06N 3/0895; G06N 3/082; G06N 3/04; G06N 3/0985; G06N 20/20; G06N 3/096; G06N 3/044; G06N 3/0442; G06N 3/0495; G06N 3/048; G06N 3/098; G06N 5/01; G06N 7/01; G06N 3/006; G06N 3/063; G06N 3/086; G06N 5/041; G06N 5/046; G06N 20/10; G06N 5/04; G06V 10/82; G06V 10/774; G06V 10/764; G06V 40/168; G06V 40/172; G06V 10/7715; G06V 20/52; G06V 40/169; G06V 40/171; G06V 40/161; G06V 10/761; G06V 10/454; G06V 10/806; G06V 40/178; G06V 10/25; G06V 20/46; G06V 40/16
See application file for complete search history.

(56) References Cited

U.S. PATENT DOCUMENTS

| | | | | |
|---|---|---|---|---|
| 2022/0310196 A1* | 9/2022 | Polykovskiy | .......... | G16B 20/00 |
| 2024/0346730 A1* | 10/2024 | Kim | ........................ | G06T 13/40 |

OTHER PUBLICATIONS

Kim, et al., "Diffusion Video Autoencoders: Toward Temporally Consistent Face Video Editing via Disentangled Video Encoding", In Proceedings of the IEEE/CVF Conference on Computer Vision and Pattern Recognition, 2023, pp. 6091-6100.

Tzaban, et al., "Research-Article Share on Stitch it in Time: GAN-Based Facial Editing of Real Videos", In Proceedings of SIGGRAPH Asia Conference Papers, Dec. 6, 2022, 9 Pages.

* cited by examiner

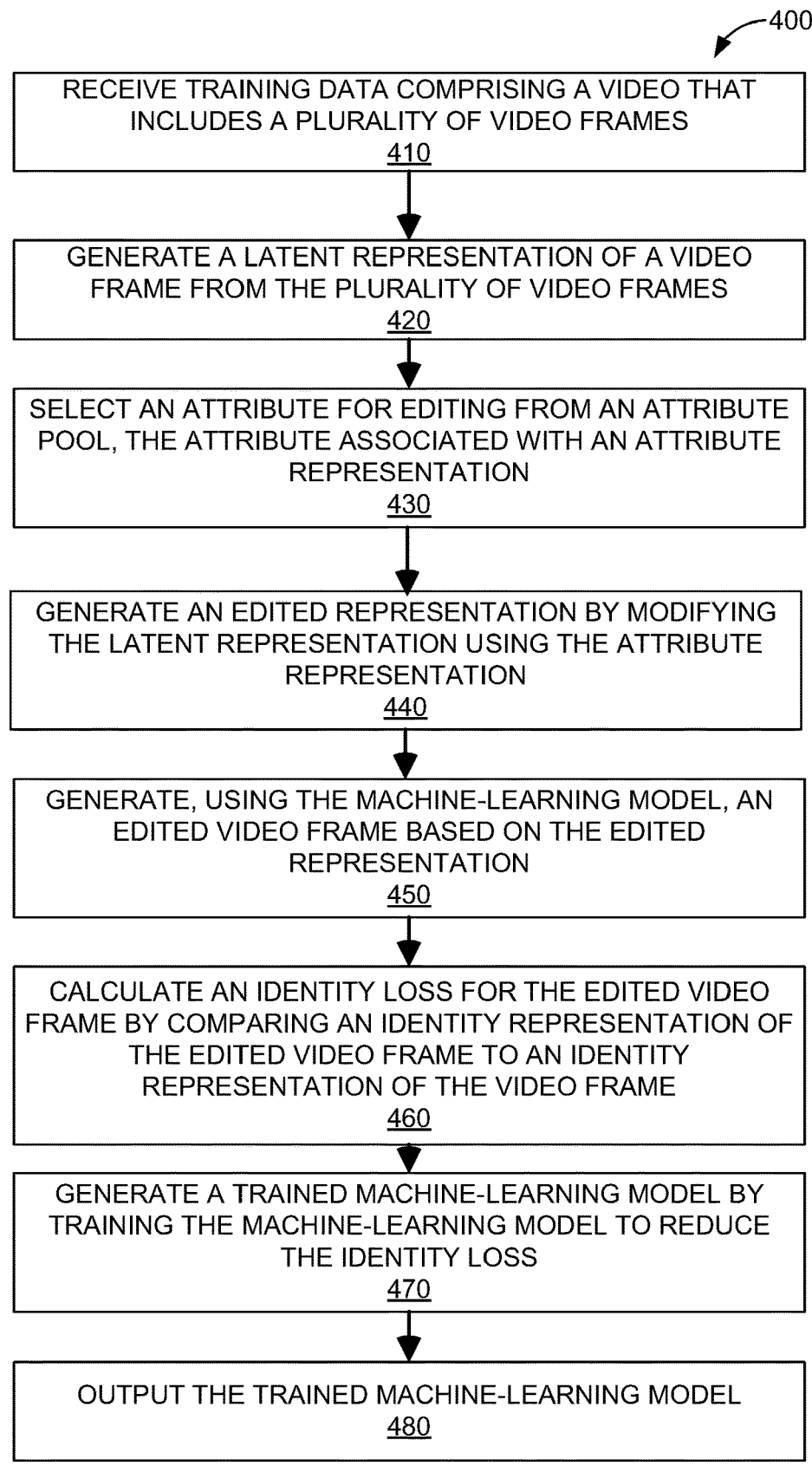

400

RECEIVE TRAINING DATA COMPRISING A VIDEO THAT INCLUDES A PLURALITY OF VIDEO FRAMES
410

GENERATE A LATENT REPRESENTATION OF A VIDEO FRAME FROM THE PLURALITY OF VIDEO FRAMES
420

SELECT AN ATTRIBUTE FOR EDITING FROM AN ATTRIBUTE POOL, THE ATTRIBUTE ASSOCIATED WITH AN ATTRIBUTE REPRESENTATION
430

GENERATE AN EDITED REPRESENTATION BY MODIFYING THE LATENT REPRESENTATION USING THE ATTRIBUTE REPRESENTATION
440

GENERATE, USING THE MACHINE-LEARNING MODEL, AN EDITED VIDEO FRAME BASED ON THE EDITED REPRESENTATION
450

CALCULATE AN IDENTITY LOSS FOR THE EDITED VIDEO FRAME BY COMPARING AN IDENTITY REPRESENTATION OF THE EDITED VIDEO FRAME TO AN IDENTITY REPRESENTATION OF THE VIDEO FRAME
460

GENERATE A TRAINED MACHINE-LEARNING MODEL BY TRAINING THE MACHINE-LEARNING MODEL TO REDUCE THE IDENTITY LOSS
470

OUTPUT THE TRAINED MACHINE-LEARNING MODEL
480

FIG. 4

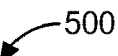

500

RECEIVE A VIDEO THAT INCLUDES A PLURALITY OF VIDEO FRAMES 510

GENERATE A LATENT REPRESENTATION OF A VIDEO FRAME FROM THE PLURALITY OF VIDEO FRAMES 520

RECEIVE AN ATTRIBUTE FOR EDITING FROM AN ATTRIBUTE POOL, THE ATTRIBUTE ASSOCIATED WITH AN ATTRIBUTE REPRESENTATION 530

GENERATE AN EDITED REPRESENTATION BY MODIFYING THE LATENT REPRESENTATION USING THE ATTRIBUTE REPRESENTATION 540

GENERATE, USING THE MACHINE-LEARNING MODEL, AN EDITED VIDEO FRAME BASED ON THE EDITED REPRESENTATION 550

MAP THE ATTRIBUTE TO A FIRST TRANSFORMER OPTIMIZED FOR A GROUP OF ATTRIBUTES TO WHICH THE ATTRIBUTE BELONGS, WHEREIN THE FIRST TRANSFORMER IS ONE OF A PLURALITY OF AVAILABLE TRANSFORMERS 560

GENERATE A NORMALIZED EDITED REPRESENTATION USING THE FIRST TRANSFORMER USING THE EDITED REPRESENTATION AS INPUT 570

GENERATE, USING A MACHINE-LEARNING MODEL, AN EDITED VIDEO FRAME BASED ON THE NORMALIZED EDITED REPRESENTATION 580

OUTPUT THE EDITED VIDEO FRAME 590

FIG. 5

600

RECEIVE TRAINING DATA COMPRISING A VIDEO THAT INCLUDES A PLURALITY OF VIDEO FRAMES 610

GENERATE A LATENT REPRESENTATION OF A VIDEO FRAME FROM THE PLURALITY OF VIDEO FRAMES 620

SELECT AN ATTRIBUTE FOR EDITING FROM AN ATTRIBUTE POOL, THE ATTRIBUTE ASSOCIATED WITH AN ATTRIBUTE REPRESENTATION 630

GENERATE AN EDITED REPRESENTATION BY MODIFYING THE LATENT REPRESENTATION USING THE ATTRIBUTE REPRESENTATION 640

MAP THE ATTRIBUTE TO A FIRST TRANSFORMER OPTIMIZED FOR A GROUP OF ATTRIBUTES TO WHICH THE ATTRIBUTE BELONGS, WHEREIN THE FIRST TRANSFORMER IS ONE OF A PLURALITY OF AVAILABLE TRANSFORMERS 650

GENERATE A NORMALIZED EDITED REPRESENTATION USING THE FIRST TRANSFORMER USING THE EDITED REPRESENTATION AS INPUT 660

GENERATE, USING A MACHINE-LEARNING MODEL, AN EDITED VIDEO FRAME BASED ON THE NORMALIZED EDITED REPRESENTATION 670

FIG. 6

CALCULATE AN IDENTITY LOSS FOR THE EDITED VIDEO FRAME BY COMPARING AN IDENTITY REPRESENTATION OF THE EDITED VIDEO FRAME TO AN IDENTITY REPRESENTATION OF THE VIDEO FRAME 680

GENERATE A TRAINED MACHINE-LEARNING MODEL BY TRAINING THE MACHINE-LEARNING MODEL TO REDUCE THE IDENTITY LOSS 690

OUTPUT THE TRAINED MACHINE-LEARNING MODEL 695

SPARSE SEMANTIC DISENTANGLED FACE ATTRIBUTE EDITING

BACKGROUND

Face attribute editing plays a pivotal role in various applications. However, existing methods encounter challenges in achieving high-quality results while preserving identity, editing faithfulness, and temporal consistency. These challenges are rooted in issues related to the training pipeline, including limited supervision, architecture design, and optimization strategy.

Early face video editing approaches exploited pre-trained Style Generative Adversarial Network (StyleGAN) to streamline the editing process. In StyleGAN, each frame undergoes an initial transformation into a representation within StyleGAN's latent space through an inversion process followed by the application of desired edits. However, the quality of editing is heavily contingent on the effectiveness of the GAN inversion process, serving as a bottleneck for overall results. More recently, diffusion models have been used in face image editing as an alternative to GAN-based approaches.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The technology described herein provides an improved framework for a face editing task performed by a machine-learning model. Aspects of the technology may be used to edit a single image or video. In general, the technology will be described herein in the context of video editing. Once trained, the machine-learning model is able to automate the video editing process. Example video editing techniques that may be performed by a machine-learning model trained according to the technology described herein include face alignment and cropping, face retouching, face replacement or swapping, facial expression manipulation, and face attribute manipulation. The technology may accommodate different machine-learning models, such as GAN-based models and diffusion-based models.

The technology provides a self-training strategy aimed at achieving more robust and generalizable face video editing. The self-training strategy helps overcome a shortage of training data relevant to the face editing task. The technology also provides a semantically disentangled architecture capable of catering to a diverse range of editing requirements. The technology also provides sparse learning to avoid over editing. The sparse learning technology partitions the model being trained according to facial regions being edited. This strategy teaches the model to transform only the most pertinent facial areas for a specific task. For example, when changing the eyebrows on a face the eye area will change, but the mouth area should remain unchanged.

The technology provides a self-training strategy aimed at achieving more robust and generalizable face video editing. Self-training is a paradigm in machine learning where a model is trained on a task using the data itself to generate supervisory signals, rather than relying on external labels provided by humans. It's a class of learning methods that use supervision available within the data to train a machine learning model. In self-training, the model is initially trained with a small amount of labeled data, then it uses this initial model to make predictions on unlabeled data. The model assigns pseudo-labels to the unlabeled data points. The pseudo-labeled examples may then be used to enrich the labeled training data and to train a new model in conjunction with the labeled training set. This process is repeated iteratively, allowing the model to improve its performance even when labeled data is scarce.

The technology also provides a semantically disentangled architecture capable of catering to a diverse range of editing requirements. Varied edits demand the encoding of facial features into distinct latent face representations, emphasizing different facial regions. The semantic disentangled architecture is capable of catering to a diverse range of editing requirements. The semantic disentangled architecture classifies all potential edits into multiple clusters based upon similarity in their semantic representations. The semantic disentangled architecture then establishes a learnable transformation specific to each cluster. These transformations are dynamically activated based on the cluster a specific edit command belongs to, contributing to an adaptive editing framework. The proposed semantic disentangled architecture significantly augments the model's capacity and effectively complements the introduced self-training strategies.

The technology also provides sparse learning to avoid over editing. Certain edits, such as (+bushy eyebrow), necessitate precise modifications to localized regions of the original face while preserving the integrity of other areas. Existing methods often exhibit a tendency to overly modify the entire face. To address this challenge, a tailored sparse learning strategy specifically designed for avoiding over-editing is used. This innovative approach involves partitioning latent face representations into multiple distinct regions and actively promoting region sparsity during the training process. Through this refined strategy, the model learns to recognize and transform only the most pertinent facial areas for each specific edit. This results in a more precise editing process and also contributes to an overall enhancement of the semantic disentangled architecture.

BRIEF DESCRIPTION OF THE DRAWINGS

The technology described herein is illustrated by way of example and not limitation in the accompanying figures in which like reference numerals indicate similar elements and in which:

FIG. 4 is a flow diagram showing a method of training a face editing model, in accordance with an aspect of the technology described herein;

FIG. 5 is a flow diagram showing a method of training a face editing model, in accordance with an aspect of the technology described herein;

FIG. 6 is a flow diagram showing a method of training a face editing model, in accordance with an aspect of the technology described herein.

DETAILED DESCRIPTION

Figure 1:
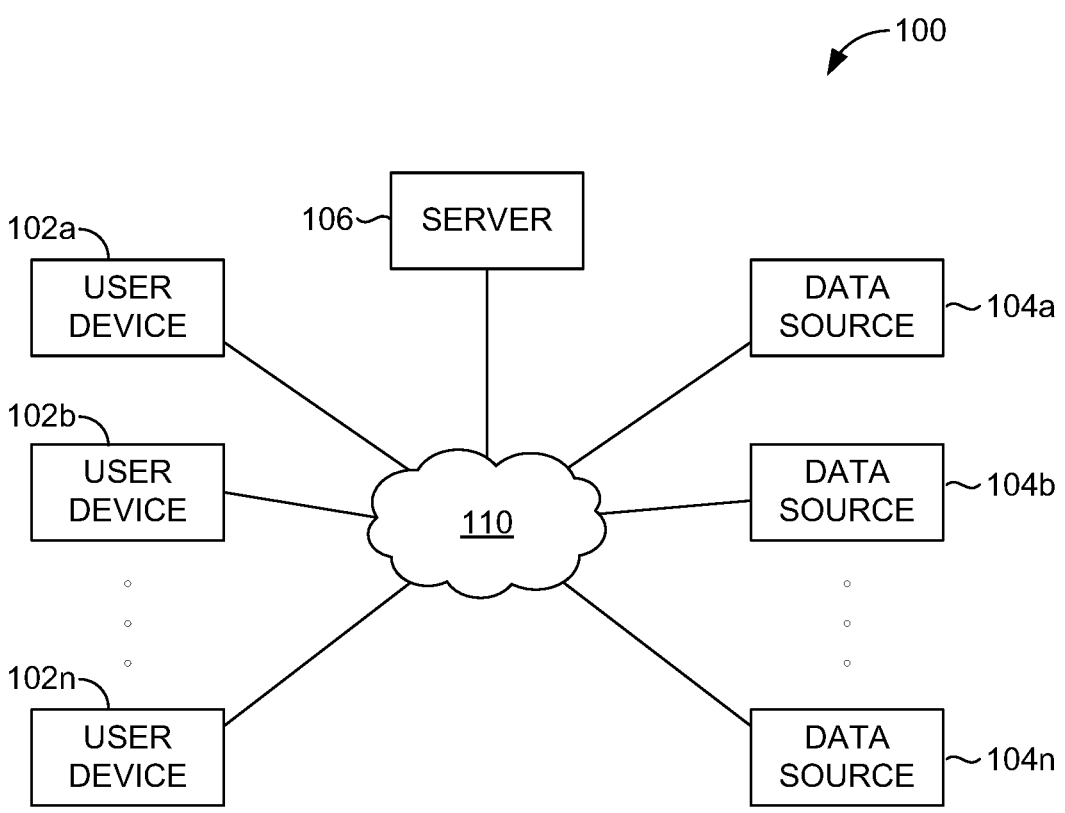
FIG. 1 is a diagram of a computing system suitable for implementations of the technology described herein.

The various technologies described herein are set forth with sufficient specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein provides an improved framework for a face editing task performed by a machine-learning model. Aspects of the technology may be used to edit a single image or video. In general, the technology will be described herein in the context of video editing. Once trained, the machine-learning model is able to automate the video editing process. Example video editing techniques that may be performed by a machine-learning model trained according to the technology described herein include face alignment and cropping, face retouching, face replacement or swapping, facial expression manipulation, and face attribute manipulation. The technology may accommodate different machine-learning models, such as GAN-based models and diffusion-based models.

In one aspect, the model architecture comprises an encoder, a transformer, and a decoder. The encoder receives the visual content and generates a content representation. The transformer alters the content representation to form an edited content representation. The alternation is made with the purpose of editing a facial feature. The decoder generates edited facial content from the edited content representation.

The technology provides a self-training strategy aimed at achieving more robust and generalizable face video editing. The self-training strategy helps overcome a shortage of training data relevant to the face editing task. The technology also provides a semantically disentangled architecture capable of catering to a diverse range of editing requirements. The technology also provides sparse learning to avoid over editing. The sparse learning technology partitions the model being trained according to facial regions being edited. This strategy teaches the model to transform only the most pertinent facial areas for a specific task. For example, when changing the eyebrows on a face the eye area will change, but the mouth area should remain unchanged.

The technology provides a self-training strategy aimed at achieving more robust and generalizable face video editing. Self-training is a paradigm in machine learning where a model is trained on a task using the data itself to generate supervisory signals, rather than relying on external labels provided by humans. It's a class of learning methods that use supervision available within the data to train a machine learning model. In self-training, the model is initially trained with a small amount of labeled data, then it uses this initial model to make predictions on unlabeled data. The model assigns pseudo-labels to the unlabeled data points. The pseudo-labeled examples may then be used to enrich the labeled training data and to train a new model in conjunction with the labeled training set. This process is repeated iteratively, allowing the model to improve its performance even when labeled data is scarce.

The scarcity of available supervised paired data is an obstacle within the domain of face video editing. In particular, available data sets such as VoxCeleb include facial content, but the content is not paired with an editing instruction. The self-training technology described herein, initiates with a latent face representation, from which pseudo-edited facial representations are generated by uniformly sampling from an editing attribute pool. The editing attribute pool comprises a plurality of facial editing instructions (e.g., redden hair, increase smile, open eyes). The technology then uses a set of training objectives that encompass identity preservation and editing faithfulness, contributing to the semi-supervision of the training process. The training objectives may take the form of loss functions where the training goal is to reduce loss. One loss function can quantify identify preservation and the other loss function quantify editing faithfulness. The various loss functions may be combined through weights (e.g., hyperparameters) that give one loss function more or less emphasis than the other. This self-training strategy significantly enhances the generalization capabilities of existing models, yielding superior editing results characterized by improved identity preservation, editing faithfulness, and enhanced temporal coherence.

The technology also provides a semantically disentangled architecture capable of catering to a diverse range of editing requirements. Varied edits demand the encoding of facial features into distinct latent face representations, emphasizing different facial regions. The semantic disentangled architecture is capable of catering to a diverse range of editing requirements. The semantic disentangled architecture classifies all potential edits into multiple clusters based upon similarity in their semantic representations. The semantic disentangled architecture then establishes a learnable transformation specific to each cluster. These transformations are dynamically activated based on the cluster a specific edit command belongs to, contributing to an adaptive editing framework. The proposed semantic disentangled architecture significantly augments the model's capacity and effectively complements the introduced self-training strategies.

The technology also provides sparse learning to avoid over editing. Certain edits, such as (+bushy eyebrow), necessitate precise modifications to localized regions of the original face while preserving the integrity of other areas. Existing methods often exhibit a tendency to overly modify the entire face. To address this challenge, a tailored sparse learning strategy specifically designed for avoiding over-editing is used. This innovative approach involves partitioning latent face representations into multiple distinct regions and actively promoting region sparsity during the training process. Through this refined strategy, the model learns to recognize and transform only the most pertinent facial areas for each specific edit. This results in a more precise editing process and also contributes to an overall enhancement of the semantic disentangled architecture.

The technologies herein are described using key terms wherein definitions are provided. However, the definitions of key terms are not intended to limit the scope of the technologies described herein.

As used herein, a Markov chain is a mathematical system that experiences transitions from one state to another according to certain probabilistic rules. The defining characteristic of a Markov chain is that no matter how the process arrived at its present state, the possible future states are fixed.

As used herein, face alignment and cropping may involve aligning the face in a standard way (for example, ensuring the eyes and mouth are at fixed positions) and cropping the face area.

As used herein, face retouching may involve enhancing the face by adjusting lighting, removing blemishes, whitening teeth, and other similar tasks.

As used herein, face replacement or swapping may involve replacing the face of a person in a video with another face.

As used herein, facial expression manipulation may involve changing the facial expressions of a person in a video.

As used herein, face attribute manipulation may involve changing facial attributes such as age, gender, or hair color.

As used herein, editing faithfulness quantifies how well the editing is performed with the given model. In an aspect, it consists of two parts: Target Attribute Change Rate (TACR) and Non-target Attribute Preservation Rate (NAPR). The former measures the percentage of frames that the target attribute has been changed, while the latter computes the frame percentage where the non-target attributes have been preserved.

As used herein, identity preservation computes the identity similarity between the edited frame and the original frame and is averaged across all frames.

As used herein, temporal consistency measures relative temporal coherency between the edited video and the original video. In aspects, two different metrics are used to measure relative temporal coherency. Temporally-global identity (TG-ID) measures the identity similarity for all frame pairs in the edited video, normalized by the corresponding similarity in the original video. In contrast, temporally-local identify (TL-ID) considers and computes the similarity for every two adjacent frames only.

Having briefly described an overview of aspects of the technology described herein, an operating environment in which aspects of the technology described herein may be implemented is described below in order to provide a general context for various aspects.

Turning now to FIG. 1, a block diagram is provided showing an example operating environment 100 in which some embodiments of the present disclosure can be employed. It should be understood that this and other arrangements described herein are set forth only as examples. Other arrangements and elements (for example, machines, interfaces, functions, orders, and groupings of functions) can be used in addition to or instead of those shown, and some elements can be omitted altogether for the sake of clarity. Further, many of the elements described herein are functional entities that are implemented as discrete or distributed components or in conjunction with other components, and in any suitable combination and location. Various functions described herein as being performed by one or more entities are carried out by hardware, firmware, and/or software. For instance, some functions are carried out by a processor executing instructions stored in memory.

Among other components not shown, example operating environment 100 includes a number of user computing devices, such as user devices 102b through 102n; a number of data sources, such as data sources 104a and 104b through 104n; server 106; and network 110. Each of the components shown in FIG. 1 is implemented via any type of computing device, such as computing device 700 illustrated in FIG. 7, for example. In one embodiment, these components communicate with each other via network 110, which includes, without limitation, one or more local area networks (LANs)

and/or wide area networks (WANs). In one example, network 110 comprises the internet, intranet, and/or a cellular network, amongst any of a variety of possible public and/or private networks.

It should be understood that any number of user devices, servers, and data sources can be employed within operating environment 100 within the scope of the present disclosure. Each may comprise a single device or multiple devices cooperating in a distributed environment, such as the distributed computing device 700 in FIG. 7. For instance, server 106 is provided via multiple devices arranged in a distributed environment that collectively provides the functionality described herein. Additionally, other components not shown may also be included within the distributed environment.

User devices 102b through 102n can be client user devices on the client-side of operating environment 100, while server 106 can be on the server-side of operating environment 100. Server 106 can comprise server-side software designed to work in conjunction with client-side software on user devices 102b through 102n so as to implement any combination of the features and functionalities discussed in the present disclosure. In one aspect, the server hosts a face editing model and training system. In aspects, the user devices 102b through 102n provide a user interface to the face editing model system 200 or semantic-disentangled face editing model system 300. This division of operating environment 100 is provided to illustrate one example of a suitable environment, and there is no requirement for each implementation that any combination of server 106 and user devices and 102b through 102n remain as separate entities.

In some embodiments, user devices 102b through 102n comprise any type of computing device capable of use by a user. For example, in one embodiment, user devices 102b through 102n are the type of computing device 700 described in relation to FIG. 7. By way of example and not limitation, a user device is embodied as a personal computer (PC), a laptop computer, a mobile device, a smartphone, a tablet computer, a virtual-reality (VR) or augmented-reality (AR) device or headset, a handheld communication device, an embedded system controller, a consumer electronic device, a workstation, any other suitable computer device, or any combination of these delineated devices.

In some embodiments, data sources 104a and 104b through 104n comprise data sources and/or data systems, which are configured to make data available to any of the various constituents of operating environment 100 or system 200 described in connection to FIG. 2. The data sources may include training data for the face editing model system 200 or semantic-disentangled face editing model system 300 and/or input and output from a trained model. For example, the data sources 104a and 104b through 104n Certain data sources 104a and 104b through 104n are discrete from user devices 102b through 102n and server 106 or are incorporated and/or integrated into at least one of those components. In one embodiment, one or more of data sources 104a and 104b through 104n comprise one or more sensors, which are integrated into or associated with one or more of the user device(s) 102b through 102n or server 106. For example, the data sources could include a web camera used to interact with a virtual environment.

Operating environment 100 can be utilized to implement one or more of the components of system 200, as described in FIG. 2. Operating environment 100 can also be utilized for implementing aspects of methods 400, 500, and 600 in FIGS. 4, 5, and 6, respectively.

Figure 2A:
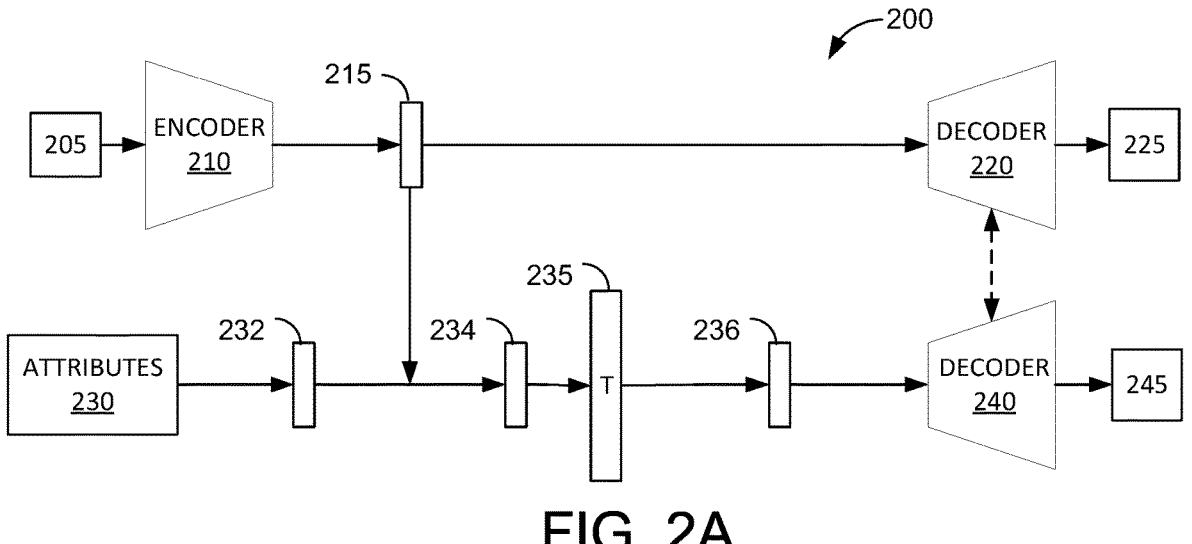
FIG. 2A is a block diagram of an example operating environment for a face editing model, in accordance with an aspect of the technology described herein.
Figure 2B:
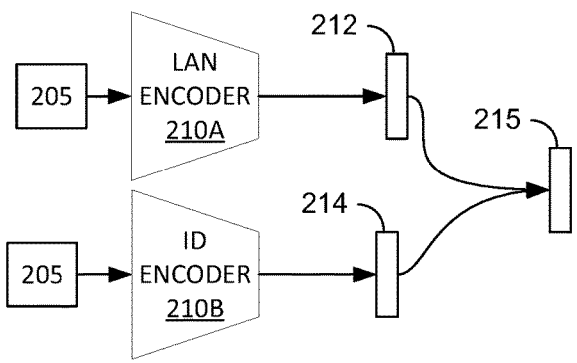
FIG. 2B is a block diagram of an example encoder for a face editing model, in accordance with an aspect of the technology described herein.

Referring now to FIG. 2A with FIG. 1, a block diagram is provided showing aspects of an example computing system architecture suitable for implementing some embodiments of the disclosure and designated generally as system 200. FIG. 2A illustrates a diffusion model capable of making facial edits. The diffusion model is trained using editing aware training. The goal of system 200 is to receive a video including a face, receive a face editing instruction, and produce an edited video that includes the face modified according to the editing instruction. The video may be edited one frame at a time. FIG. 2A shows the editing of a single unedited frame 205 of a video. In implementations, the process used to edit a single frame is repeated on a series of frames to produce an edited video.

The system 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location. These components may be embodied as a set of compiled computer instructions or functions, program modules, computer software services, or an arrangement of processes carried out on one or more computer systems.

In one embodiment, the functions performed by components of system 200 are associated with training and using a face editing model. These components, functions performed by these components, and/or services carried out by these components may be implemented at appropriate abstraction layer(s) such as the operating system layer, application layer, and/or hardware layer of the computing system(s). Alternatively, or in addition, the functionality of these components, and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs). Additionally, although functionality is described herein with regards to specific components shown in example system 200, it is contemplated that in some embodiments functionality of these components can be shared or distributed across other components and/or computer systems.

Face video editing endeavors to effectively manipulate the original video while preserving both the facial identity and temporal consistency between frames. The preservation of facial identify maintains the appearance of a face, except for the attribute change. For example, when changing eye color, then skin or hair color should remain the same to achieve high facial identify. The temporal consistency is changing each frame the same way, regardless of whether facial identify is maintained. Thus, temporal consistency could be high, while facial identify is low if hair color (as an example) is incorrectly changed if the hair color is changed consistently across all frames.

Attribute-based human-face video editing is one type of video editing that may be performed by the face editing system 200. Formally, given a human face video $\mathcal{V} = \{f_1,$ $f_2, \ldots, f_N\}$ comprised of N sequential frames, the objective is to manipulate the face video with a designated attribute $\alpha \in \mathcal{A}$, where $$\mathcal{A} = \{a_j\}_{j=1}^M$$

represents the set of all conceivable attribute edits 230. For semantic attribute editing, each attribute $\alpha_j \in \mathcal{A}$ is embedded into an embedded representation 232 $a_j \in \mathbb{R}^d$. During editing, the semantic representation may be combined with the latent face representation 215 to generate an edited latent face representation 234.

The underlying editing model can be succinctly represented as $\mathcal{M} = \{E, \mathcal{D}\}$, where the former, E, denotes an encoder 210 which encodes a face into its latent face representation 215, while the latter, $\mathcal{D}$, represents a decoder 220 generating an edited frame 225 of the face from the latent face representation 215. In the case of a diffusion model, the decoder 220 may take the form of a U-Net. Diffusion models work by corrupting the training data by progressively adding noise (e.g., Gaussian noise), slowly wiping out details in the training data until it becomes pure noise, and then training a neural network to reverse this corruption process. Running this reversed corruption process synthesizes data from pure noise by gradually denoising it until a sample is produced. The training objective may be minimizing a difference between the added noise distribution and a predicted noise distribution.

The self-training strategy may work with generative models, diffusion models, and the like. FIG. 2 shows a diffusion model, but the technology is not limited for use with a diffusion model. In many models types, the face editing process occurs on the latent face representation 215 of the original face in unedited frame 205, which afterward serves as the condition for the generative model to generate an edited face in edited frame 225. However, these generative models are typically trained on face video datasets without explicit editing signals during training. Consequently, when deployed for face editing, the pre-trained generative models encounter difficulties in achieving high-quality and coherent results, primarily due to limited generalizability. A straightforward resolution to this challenge may involve collecting video data with editing annotations for joint training of the generative model. However, this is often cost-prohibitive and impractical, particularly for imaginative edits such as gender transformation. In response to these limitations, the technology described herein introduces an innovative self-training strategy explicitly designed to enhance the generalizability of generative models for diverse face editing tasks. In aspects, a Denoising Diffusion Implicit Models (DDIM) may be used. In aspects, a pre-trained DDIM model may be used as the starting point for the editing training. A pre-trained model may be trained to produce an output image given an input image without editing the image.

Given an unedited frame 205 $f \in V^1$, it is encoded into the latent space with the encoder 210, resulting in face representation 215 $x \leftarrow \varepsilon(f)$. While described as a face representation, the face representation 215 may be a representation of the frame content, including the face being edited, background, and other content. In the conventional training process, the face representation 215 x acts as the condition for the generation model to produce edited frame 225. In aspects of the technology described herein, the edited frame 225 is generated for use in calculating a training loss, as explained subsequently. In contrast, during editing, the face representation 215 is changed according to a desired attribute change to produce an edited latent face representation 234. Specifically, during training, given the face representation 215 x, the system randomly selects an attribute $a \in \mathcal{A}$ from available attribute edits 230 with an embedded representation 232 $a \in \mathbb{R}^d$. Then a pseudo-edit step is performed on the latent face representation 215 using the embedded representation 232 to generate an edited latent face representation 234 $\hat{x}$ as follows.

$$\hat{x} \leftarrow T(\text{Denormalize}(\text{Normalize}(x) + \gamma \cdot a)), \qquad (1)$$

where $\gamma$ is a randomly selected edit scale $\gamma \sim$ Uniform (0,1) to control the aggressiveness of editing affects, where 0 would cause no editing and 1 maximizes the editing. $T(\cdot)$ represents a learnable transformation 235 to encode the edited latent face representation 234 into the original latent space and forming normalized latent 236. Subsequently, the edited latent $\hat{x}$ is utilized as the condition to generate an edited frame 245 with the Decoder 240 $\hat{f} \leftarrow \mathcal{D}(\hat{x})$. The pseudo-edit process produces numerous paired-wise training samples (e.g., 225 and 245) that may be used in training. Specific objective functions may be used to effectively capture the editing faithfulness within the training samples.

In aspects, the encoder 210 may comprise a landmark encoder 210A and an identity encoder 210B, as shown in FIG. 2A. The landmark encoding 212 may be combined with the identity encoding 214 to produce the face representation 215. The combination process may include concatenating the landmark encoding 212 and the identity encoding 214 and passed through a learnable multi-layer perceptron network to produce the face representation 215. In aspects, the identity encoder 210B may be calculated by averaging (or otherwise combining) the identify encoding of multiple frames within a video being edited. The identity encoding for a single frame may be generated using a pre-trained identity classifier. The identity encoding collects features related to a facial identity. The landmark encoding 212 specifies the position of facial landmarks (e.g., eyes, ears, lips, mouth, and nose).

To effectively learn from the semantics in the edited latent face representation 234 $\hat{x}$, the training process described herein includes a loss function that encourages the edited frame 245 to maintain the original identity and be faithful to the selected edit $a \in \mathcal{A}$. As such, the following objectives are used to train the generative model:

$$\mathcal{L}_{overall} := \lambda_{id}\mathcal{L}_{id} + \lambda_{faith}\mathcal{L}_{faith} + \lambda_{gen}\mathcal{L}_{gen} \qquad (2)$$

$$\mathcal{L}_{id} := \left\| \text{Arcface}(f) - \text{Arcface}(\hat{f}) \right\| \qquad (3)$$

$$\mathcal{L}_{id} := \sum_{\substack{a' \in \mathcal{A} \\ a' \neq a}} \left\| \left[ Attr(f) \right]_{a'} - \left[ Attr(\hat{f}) \right]_{a'} \right\| - \gamma \left\| \left[ Attr(f) \right]_{a} - \left[ Attr(\hat{f}) \right]_{a} \right\| \qquad (4)$$

The identity similarity may be measured using Additive Angular Margin Loss (Arcface), which is a loss function used in face recognition tasks. Here, Arcface($\cdot$) refers to the identity representation of a certain frame. The identify representation may be a machine generated embedding of facial features that are useful in uniquely identifying an individual (e.g., distance between eyes, shape of eyes, distance between and characteristics of facial landmarks). In general, these identity representations may not change substantially when attributes change. In aspects, a first identity representation of unedited frame 205 is generated along with a second identify representation of the edited frame 245. The identity loss, $\mathcal{L}_{id}$, aims to encourage the edited frame 245 to retain the original identity post-editing by minimizing a difference between the first identify representation and the second identify representation. Attr($\cdot$) refers to a pre-trained face attribute classifier producing the logits of each attribute in $\mathcal{A}$., which is part of the Arcface process used to calculate the difference between identity representations.

The fidelity loss, $\mathcal{L}_{faith}$, encourages the edited frame $\hat{f}$ to align accurately with the chosen attribute $a \in \mathcal{A}$ while preserving the integrity of other attributes that are not selected. Image fidelity refers to the ability of a process to render an image accurately, without any visible distortion or information loss. For example, if the chosen attribute edit is smile, the original facial features related to smiling (e.g., lip shape and eye shape) should change, but skin color, eye color, and hair color should not. The fidelity loss may be low when detecting changes that should occur based on the chosen attribute edit and high when detecting changes that should not occur. Furthermore, $\mathcal{L}_{gen}$ represents the standard generation loss, a common objective in original generative models such as the denoising loss. The denoising loss may be based on a difference between noise added and noise predicted. The loss function used by GAN is called an adversarial loss function that calculates the distance between the GAN distribution of the generated data and the distribution of the actual data. A GAN model may have two loss functions, one to train the generator network and the other to train the discriminator network. The hyperparameters $\lambda_{id}$, $\lambda_{faith}$, and $\lambda_{gen}$ are employed to balance the influence of these three distinct objectives: identity preservation, attribute fidelity, and generation, respectively. The hyperparameters may alternatively be described herein as weights.

Figure 3:
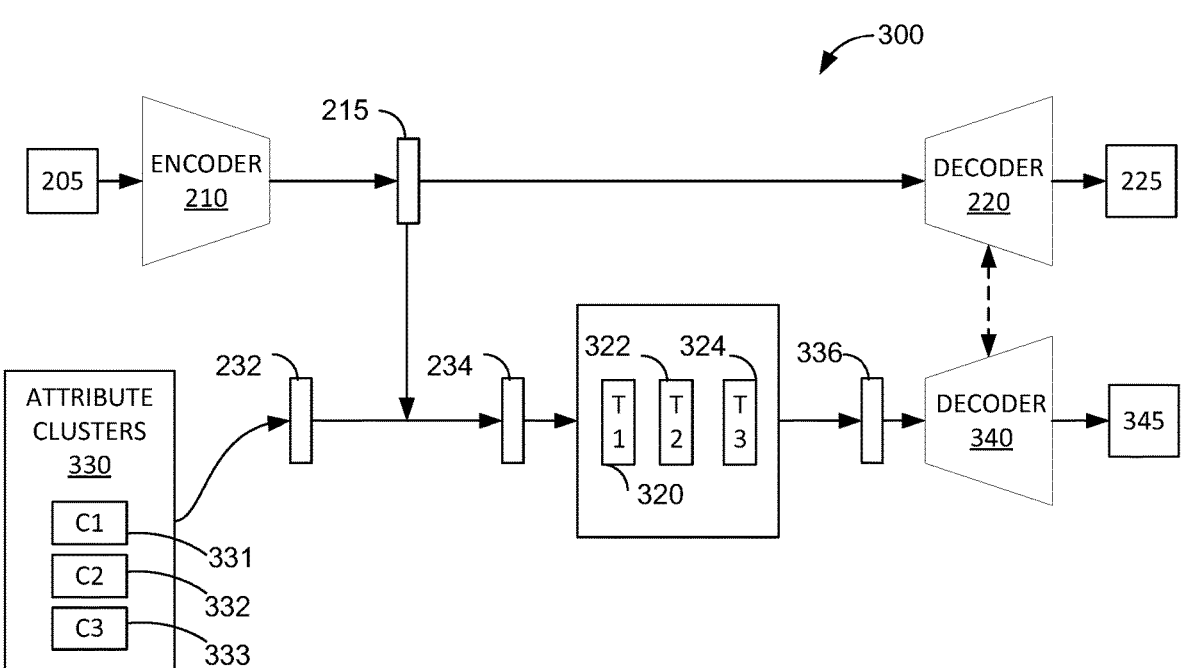
FIG. 3 is a block diagram of an example operating environment for a semantic-disentangled face editing model, in accordance with an aspect of the technology described herein.

Turning now to FIG. 3, a semantic disentangled architecture is added to the editing aware training process described previously with reference to FIGS. 2A and 2B. Existing face video editing methods typically transform an unedited frame 205 f into a latent face representation 215 x, which then undergoes a single transformation before being input to a decoder 240 D for content generation. However, this one-size-fits-all paradigm may not adequately address the diverse requirements of various editing tasks. For example, editing the eyes might necessitate a different transformation on the face frame compared to editing the mouth. This variability, or editing-level heterogeneity, challenges the efficacy of using a single learnable transformation 235. Meanwhile, the self-training strategy, as detailed above, generates numerous pseudo-edited samples during the training process. Effectively managing these heterogeneous samples improves the quality of edited video frames.

To overcome editing-level heterogeneity, the technology uses a semantic disentangled editing architecture. This architecture dynamically activates its processing route based on the specific facial attribute being edited, effectively addressing instance-level heterogeneity and providing a more tailored and precise editing outcome. As mentioned previously, a set of attribute edits 230, denoted as $\mathcal{A}$, may be available to the system. These attributes $\mathcal{A}$. These attributes have their respective embedded representations $$\{a_j\}_{j=1}^{M}$$

K-Means clustering algorithm may be applied to group these representations into K disjoint clusters C_1, C_2, . . . , C_K. This grouping is based on semantic similarity, ensuring that attributes or edits that are similar over semantic representations are placed in the same cluster. For each cluster $C_K$, a specific transformation $T_K$ is assigned. This transformation is applied to the edited latent face representation 234 of the face and is dynamically chosen based on the particular edit being applied. FIG. 3 shows a first transformation 320, a second transformation 322, and a third transformation 324. The selected transformation generates a normalized latent 336. The decoder 340 may generate an edited video 345 frame using normalized latent 236 as input. The disentangled architecture design offers several advantages. It (i) enables the model to more effectively handle a variety of editing tasks and (ii) enhances the utility of the self-training process, leading to more versatile and generalizable editing capabilities.

Assigning a transformation to a group of similar attributes may have resource efficiency advantages over assigning a single transformation to a single attribute, without scarifying quality. Assigning a unique transformation to each attribute, has limitations, especially when encountering new, unseen attributes and in terms of the resources required to maintain a large number of attribute-specific transformations. The technology described herein overcomes these challenges with two key advantages: (i) Generality: The architecture described herein is more adaptable to new attributes by activating a module with the closest semantic similarity to the new attribute, rather than necessitating a predefined transformation for each possible attribute. (ii) Resource Efficiency: the technology described herein is significantly more resource-efficient. Instead of scaling the number of transformations with the number of attributes, this technology maintains a limited number of cluster transformations. This design not only conserves computational resources but also simplifies the model's scalability, making it more practical for a wider range of applications.

In an aspect, each transformation may comprise a single linear layer. Fully-connected layers, also known as linear layers, connect every input neuron to every output neuron. The transformation may be trained to generate a normalized latent 236 given the edited latent as input. In aspects, the attribute representation may also be provided. The training may be managed to maximize the attribute edit without undue edits to other attributes.

A significant challenge in current facial editing methodologies is over-editing, i.e., transforming the areas that should be not changed. There are scenarios where a comprehensive, global adjustment to an image is desired. However, for certain edits, such as adding Bushy_Eyebrows, changing only a specific portion of the image is preferred. Current editing technologies have overlooked this dichotomy, leading to suboptimal editing outcomes. Overly global adjustments may arise because the activations of neurons within the editing model are intertwined; some neurons inadvertently have a detrimental influence on the outcome. To circumvent this, the face editing technology described herein may incorporate a sparse learning technique into the self-training strategy and the semantic disentangled architecture aimed specifically at refining the granularity of localized edits, ensuring that modifications are made precisely where intended.

Neuron Partition. Within the editing model $\mathcal{M}$, given the trainable neurons denoted as θ, the initial step involves segregating the neurons into distinct groups $\mathcal{G}$. This partitioning is adaptable, and subject to various criteria. For instance, a face may be intuitively segmented into multiple sections based on its facial landmark, as described with reference to FIG. 2B. Subsequently, each facial segment is transmuted into a latent face representation through a designated transformation. The technology described herein may use a sparse implementation of this transformation; that is, certain transformations are selectively deactivated. As a result, during post-editing, specific portions of the face representation remain unaltered and preserve the original features in those regions. The definition of a group hinges on the transformation executed upon it, ensuring that only the targeted areas are modified.

Structured Sparse Learning. Upon the neuron partition $\mathcal{G}$, the technology described herein then employs structured sparsity learning to identify the neurons to be deactivated. Such a problem can be formulated as follows.

$$\underset{\theta \in \mathbb{R}^n}{\text{minimize}} \; \mathcal{L}_{overall} \qquad (5)$$

$$\text{s.t. Cardinality } \{g \mid g \in \mathcal{G} \text{ and } [\theta]_g = 0\} = Q,$$

where Q is the target sparsity level, and the cardinality measures the size of zero groups in $\mathcal{G}$. To solve problem (5), the technology described herein may use the sparse optimizer DHSPG and stabilize its sparsity exploration. The term "DHSPG" refers to the Dual Half-Space Projected Gradient, a novel sparse optimizer proposed in the context of deep neural network (DNN) training and compression. It's part of the third-generation Only-Train-Once (OTOv3) framework, which aims to automatically train and compress a general DNN through pruning and erasing operations, creating a compact and competitive sub-network without the need for fine-tuning.

In the OTOv3 framework, DHSPG is used to formulate a constrained structured sparse optimization problem and solve it by identifying redundant modules and applying a hybrid training schema. This process helps to structurally prune a general DNN. In particular, DHSPG at first converts the sparsity constraints in problem (5) into an explicit regularization term to form an unconstrained optimization problem as follows. After a warm-up phase, a subset of groups of neurons are then progressively pushed to the origin, and projected as zero to be deactivated.

$$\underset{\theta \in \mathbb{R}^n}{\text{minimize}} \; \mathcal{L}_{overall} = \sum_{g \in \mathcal{G}} \lambda_g \|[\theta]_g\|_2, \qquad (6)$$

where $\lambda_g$ is the regularization coefficient for each $g \in \mathcal{G}$. The larger coefficient typically yields sparsity more aggressively. The selection of the regularization coefficient may depend on time-consuming hyper-parameter tuning efforts. Such inconvenience further results in unreliable sparsity exploration, i.e., the final solution may not reach the target sparsity level Q under improperly selected $\lambda_g$. To mitigate the issues, an implicit regularization schema may be used. In general, after updating a trial iterate based on some first-order optimization, the technology described herein automatically computes $\lambda_g$ for each $g \in \mathcal{G}$ such that the magnitude of $[\theta]_g$ must be reduced at least by some certain degree. The computation of $\lambda_g$ is performed upon a line-search schema, starting from an initial value, and increasing it until the magnitude reduction meets a desired level. As a result, the enhanced optimizer is less sensitive to the hyper-parameter selection compared to the basic DHSPG. The group sparse iterate with the best evaluation performance θ* may be returned for further editing usage.

Example Methods

Now referring to FIGS. 4, 5 and 6, each block of methods 400, 500, and 600, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by an operating system. In addition, methods 400, 500, and 600 are described, by way of example, with respect to FIGS. 1-3. However, these methods may additionally or alternatively be executed by any one system, or any combination of systems, including, but not limited to, those described herein.

FIG. 4 is a flow diagram showing a method 400 of training video editing model, in accordance with some embodiments of the present disclosure. Method 400 may be performed on or with systems similar to those described with reference to FIGS. 1-3.

At step 410, the method 400 includes receiving training data comprising a video that includes a plurality of video frames. In aspects, the video depicts one or more faces. At step 420, the method 400 includes generating a latent face representation of a video frame from the plurality of video frames.

At step 430, the method 400 includes selecting an attribute for editing from an attribute pool, the attribute associated with an attribute representation. Example attributes that may be edited include facial hair, facial hair color, facial hair length, hair color, hair style, hair length, nose characteristics, eye characteristics, facial expression (e.g., smile, frown, laugh, cry), apparent age, gender, and the like. At step 440, the method 400 includes generating an edited representation by modifying the latent face representation using the attribute representation. At step 450, the method 400 includes generating, using the machine-learning model, an edited video frame based on the edited representation.

At step 460, the method 400 includes calculating an identity loss for the edited video frame by comparing an identity representation of the edited video frame to an identity representation of the video frame. At step 470, the method 400 includes generating a trained machine-learning model by training the machine-learning model to reduce the identity loss. At step 480, the method 400 includes outputting the trained machine-learning model.

FIG. 5 is a flow diagram showing a method 500 of using a video editing model, in accordance with some embodiments of the present disclosure. Method 500 may be performed on or with systems similar to those described with reference to FIGS. 1-3.

At step 510, the method 500 includes receiving a video that includes a plurality of video frames. In aspects, the video depicts one or more faces. At step 520, the method 500 includes generating a latent face representation of a video frame from the plurality of video frames. At step 530, the method 500 includes receive an attribute for editing from an attribute pool, the attribute associated with an attribute representation. Example attributes that may be edited include facial hair, facial hair color, facial hair length, hair color, hair style, hair length, nose characteristics, eye characteristics, facial expression (e.g., smile, frown, laugh, cry), apparent age, gender, and the like. At step 540, the method 500 includes generating an edited representation by modifying the latent face representation using the attribute representation.

At step 550, the method 500 includes mapping the attribute to a first transformer optimized for a group of attributes to which the attribute belongs, wherein the first transformer is one of a plurality of available transformers. At step 560, the method 500 includes generating a normalized edited representation using the first transformer using the edited representation as input. At step 570, the method 500 includes generating, using a machine-learning model, an edited video frame based on the normalized edited representation. At step 580, the method 500 includes outputting the edited video frame.

FIG. 6 is a flow diagram showing a method 600 of training an SR model, in accordance with some embodiments of the present disclosure. Method 600 may be performed on or with systems similar to those described with reference to FIGS. 1-3.

At step 610, the method 600 includes receiving training data comprising a video that includes a plurality of video frames. In aspects, the video depicts one or more faces. At step 620, the method 600 includes generating a latent face representation of a video frame from the plurality of video frames. At step 630, the method 600 includes selecting an attribute for editing from an attribute pool, the attribute associated with an attribute representation. Example attributes that may be edited include facial hair, facial hair color, facial hair length, hair color, hair style, hair length, nose characteristics, eye characteristics, facial expression (e.g., smile, frown, laugh, cry), apparent age, gender, and the like.

At step 640, the method 600 includes generating an edited representation by modifying the latent face representation using the attribute representation. At step 650, the method 600 includes mapping the attribute to a first transformer optimized for a group of attributes to which the attribute belongs, wherein the first transformer is one of a plurality of available transformers. At step 660, the method 600 includes generating a normalized edited representation using the first transformer using the edited representation as input.

At step 670, the method 600 includes generating, using a machine-learning model, an edited video frame based on the normalized edited representation. At step 680, the method 600 includes calculating an identity loss for the edited video frame by comparing an identity representation of the edited video frame to an identity representation of the video frame. At step 690, the method 600 includes generating a trained machine-learning model by training the machine-learning model to reduce the identity loss. At step 695, the method 600 includes outputting the trained machine-learning model.

Example Operating Environment

Figure 7:
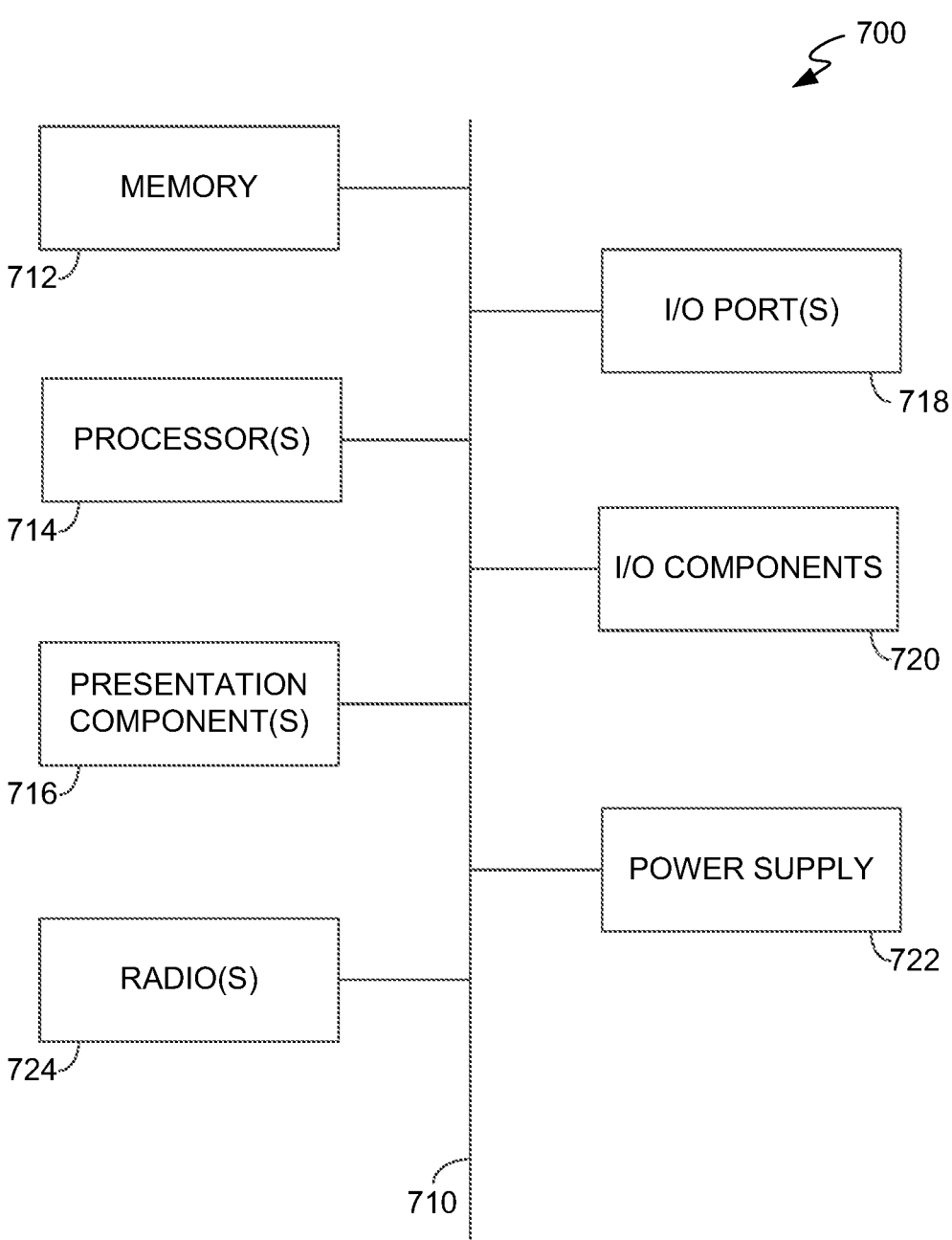
FIG. 7 is a block diagram showing a computing device suitable for implementations of the technology described herein.

Referring to the drawings in general, and initially to FIG. 7 in particular, an example operating environment for implementing aspects of the technology described herein is shown and designated generally as computing device 700. Computing device 700 is but one example of a suitable computing environment and is not intended to suggest any limitation as to the scope of use of the technology described herein. Neither should the computing device 700 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 7, computing device 700 includes a bus 710 that directly or indirectly couples the following devices: memory 712, one or more processors 714, one or more presentation components 716, input/output (I/O) ports 718, I/O components 720, and an illustrative power supply 722. Bus 710 represents what may be one or more busses (such as an address bus, data bus, or a combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 7 is merely illustrative of a computing device that may be used in connection with one or more aspects of the technology described herein. Distinction is not made between such categories as "workstation," "server," "laptop," "handheld device," etc., as all are contemplated within the scope of FIG. 7 and refer to "computer" or "computing device."

Computing device 700 typically includes a variety of computer-readable media. Computer-readable media may be any available media that may be accessed by computing device 700 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer storage media in the form of volatile and/or nonvolatile memory. The memory 712 may be removable, non-removable, or a combination thereof. Example memory includes solid-state memory, hard drives, optical-disc drives, etc. Computing device 700 includes one or more processors 714 that read data from various entities such as bus 710, memory 712, or I/O components 720. Presentation component(s) 716 present data indications to a user or other device. Example presentation components 716 include a display device, speaker, printing component, vibrating component, etc. I/O ports 718 allow computing device 700 to be logically coupled to other devices, including I/O components 720, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 714 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 700. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

A computing device may include a radio 724. The radio 724 transmits and receives radio communications. The computing device may be a wireless terminal adapted to receive communications and media over various wireless networks. Computing device 700 may communicate via wireless policies, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 policies.

Embodiments

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

What is claimed is:

1. One or more computer storage media comprising computer-executable instructions that when executed by computing device performs a method of training a machine-learning model, the method comprising:
    receiving training data comprising a video that includes a plurality of video frames;
    generating a latent face representation of a video frame from the plurality of video frames;
    selecting an attribute for editing from an attribute pool, the attribute associated with an attribute representation;
    generating an edited representation by modifying the latent face representation using the attribute representation;
    generating, using the machine-learning model, an edited video frame based on the edited representation;
    calculating an identity loss for the edited video frame by comparing an identity representation of the edited video frame to an identity representation of the video frame;
    generating a trained machine-learning model by training the machine-learning model to reduce the identity loss; and
    outputting the trained machine-learning model.

2. The media of claim 1, wherein the method further comprises calculating an attribute loss for the edited video frame by comparing an attribute representation of the edited video frame to the attribute representation of the video frame; and
    wherein the trained machine-learning model is further trained by reducing a first combination of the identity loss and the attribute loss.

3. The media of claim 2, wherein the method further comprises calculating a standard loss for the machine-learning model; and
    wherein the trained machine-learning model is further trained by reducing a second combination of the identity loss, the attribute loss, and the standard loss.

4. The media of claim 3, wherein machine-learning model is a diffusion model and the standard loss is based on a difference between noise added and noise predicted during denoising.

5. The media of claim 3, wherein the second combination is weighted using a first weight for the identity loss, a second weight for the attribute loss, and a third weight for the standard loss.

6. The media of claim 1, wherein the method further comprises selecting, from a plurality of attribute groups, a first attribute group for the attribute, wherein the first attribute group comprises a first plurality of attributes having a semantic similarity.

7. The media of claim 6, wherein the method further comprises generating a normalized edited representation using a first transformer trained for processing edited representations generated using the first plurality of attributes.

8. The media of claim 7, wherein the first transformer includes groups of neurons that are deactivated to avoid changing a region of a face that is not associated with the attribute.

9. A method of editing a video with a facial image comprising:
    receiving a video that includes a plurality of video frames;
    generating a latent face representation of a video frame from the plurality of video frames;
    receive an attribute for editing from an attribute pool, the attribute associated with an attribute representation;
    generating an edited representation by modifying the latent face representation using the attribute representation;
    mapping the attribute to a first transformer optimized for a group of attributes to which the attribute belongs, wherein the first transformer is one of a plurality of available transformers;
    generating a normalized edited representation using the first transformer using the edited representation as input;
    generating, using a machine-learning model, an edited video frame based on the normalized edited representation; and
    outputting the edited video frame.

10. The method of claim 9, wherein the attribute is part of a plurality of similar attributes forming an attribute group that is associated with the first transformer.

11. The method of claim 10, wherein the plurality of similar attributes are identified using a clustering algorithm that forms clusters based on a similarity between attribute representations corresponding to different attributes.

12. The method of claim 9, wherein the first transformer includes groups of neurons that are deactivated to avoid changing a region of a face that is not associated with the attribute.

13. The method of claim 8, wherein the machine-learning model is a diffusion model.

14. The method of claim 8, wherein the machine-learning model is a GAN.

15. A method of training a face editing model, comprising:
    receiving training data comprising a video that includes a plurality of video frames;
    generating a latent face representation of a video frame from the plurality of video frames;
    selecting an attribute for editing from an attribute pool, the attribute associated with an attribute representation;
    generating an edited representation by modifying the latent face representation using the attribute representation;

mapping the attribute to a first transformer optimized for a group of attributes to which the attribute belongs, wherein the first transformer is one of a plurality of available transformers;

generating a normalized edited representation using the first transformer using the edited representation as input;

generating, using a machine-learning model, an edited video frame based on the normalized edited representation;

calculating an identity loss for the edited video frame by comparing an identity representation of the edited video frame to an identity representation of the video frame;

generating a trained machine-learning model by training the machine-learning model to reduce the identity loss; and outputting the trained machine-learning model.

16. The method of claim 15, wherein the method further comprises calculating an attribute loss for the edited video frame by comparing an attribute representation of the edited video frame to an attribute representation of the video frame; and wherein the trained machine-learning model is further trained by reducing a first combination of the identity loss and the attribute loss.

17. The method of claim 16, wherein the method further comprises calculating a standard loss for the machine-learning model; and wherein the trained machine-learning model is further trained by reducing a second combination of the identity loss, the attribute loss, and the standard loss.

18. The method of claim 17, wherein the second combination is weighted using a first weight for the identity loss, a second weight for the attribute loss, and a third weight for the standard loss.

19. The method of claim 15, wherein the attribute is part of a plurality of similar attributes forming an attribute group that is associated with the first transformer, wherein the plurality of similar attributes are identified using a clustering algorithm that forms clusters based on a similarity between attribute representations corresponding to different attributes.

20. The method of claim 15, wherein the first transformer includes groups of neurons that are deactivated to avoid changing a region of a face that is not associated with the attribute.

* * * * *